United States Patent [19]

Takagi et al.

[11] Patent Number: 4,492,079
[45] Date of Patent: Jan. 8, 1985

[54] METHOD AND APPARATUS FOR DETECTING DEGREE OF CLOGGING IN PARTICLE TRAPPING MEMBER OF INTERNAL COMBUSTION ENGINE

[75] Inventors: Shigeru Takagi, Anjo; Nobutoshi Hayashi, Nishio, both of Japan

[73] Assignee: Nippon Soken, Inc., Nishio, Japan

[21] Appl. No.: 361,613

[22] Filed: Mar. 25, 1982

[30] Foreign Application Priority Data

Mar. 30, 1981 [JP] Japan ................................ 56-46755

[51] Int. Cl.³ ............................................. F01N 3/02
[52] U.S. Cl. ..................................... 60/274; 55/283;
  55/DIG. 30; 60/286; 60/311; 73/38
[58] Field of Search ................. 60/311, 286, 274;
  73/38; 340/606, 607, 611; 55/283, DIG. 30

[56] References Cited

U.S. PATENT DOCUMENTS

| | | | |
|---|---|---|---|
| 3,412,786 | 11/1968 | Taylor | 73/38 |
| 3,937,015 | 2/1976 | Akado et al. | |
| 4,198,853 | 4/1980 | Graham | 73/38 |
| 4,211,075 | 7/1980 | Ludecke et al. | |
| 4,217,757 | 8/1980 | Crone, Jr. | |
| 4,281,512 | 8/1981 | Mills | |
| 4,319,896 | 3/1982 | Sweeney | 60/311 |
| 4,345,431 | 8/1982 | Suzuki | 60/297 |

FOREIGN PATENT DOCUMENTS

| | | |
|---|---|---|
| 2519609 | 11/1976 | Fed. Rep. of Germany . |
| 2655932 | 6/1978 | Fed. Rep. of Germany . |
| 509 | 1/1981 | Japan ........................ 60/286 |
| 2013103 | 8/1979 | United Kingdom . |

Primary Examiner—Douglas Hart
Attorney, Agent, or Firm—Cushman, Darby & Cushman

[57] ABSTRACT

Particles contained in the exhaust gas discharged from an internal combustion engine are trapped by a particle-trapping-member disposed in an exhaust gas flow path. The flow rate of the exhaust gas is measured directly or indirectly, and the pressure loss for the trapping member is compared with an exhaust gas flow rate to measure the degree of clogging trapped by the trapping member. When the degree of clogging exceeds the predetermined valve, a command signal for closing an intake throttle is generated to reproduce said particle-trapping-member.

7 Claims, 6 Drawing Figures

METHOD AND APPARATUS FOR DETECTING DEGREE OF CLOGGING IN PARTICLE TRAPPING MEMBER OF INTERNAL COMBUSTION ENGINE

BACKGROUND OF THE INVENTION

1. Field of the Invention

The present invention relates to a particle trapping-apparatus for removing particles including carbon particles as a main component thereof from the exhaust gas exhausted from an internal combustion engine, or more in particular to a method and an apparatus for detecting the degree of clogging of a particle-trapping-member including a filter member disposed in the exhaust gas passage of an internal combustion engine.

In an exhaust gas purifying-apparatus of a diesel internal combustion engine having a particle-trapping-member of a filter disposed in the exhaust gas passage, carbon particles staying in the trapping member cause the jamming thereof so that the back pressure is increased for a reduced engine output while at the same time deteriorating the fuel efficiency. It is thus necessary to detect the degree of clogging of the trapping member, namely, the quantity of the particles staying in the trapping member and to remove the clogging of the trapping member by burning the carbon particles staying in the trapping member at appropriate timing to regenerate the trapping member.

2. Description of the Prior Art

In conventional apparatuses, the timing of regeneration of the trapping member is determined in such a manner that a regeneration is conducted when the accumulated number of revolutions of the engine or the accumulated distance coverage from the preceding regeneration of the trapping member reaches a predetermined value.

The concentration of carbon particles in the exhaust gas varies with the operating conditions such as torque or engine speed by as much as more than five times. Therefore, if the timing of regeneration is set to a small number of accumulated engine revolutions or accumulated distance coverage, regeneration is often conducted undesirably before a considerable amount of carbon particles have not yet stayed in the trapping member. This results in frequent unnecessary regenerations, which in turn causes the deterioration of fuel efficiency and the driving feeling at the same time.

If the regeneration timing is set to an excessive number of accumulated engine revolutions or accumulated distance coverage, on the other hand, an excessive amount of carbon particles often come to stay in the trapping member, with the result that the back pressure is increased for a great reduction in the engine output, which also causes the deterioration of fuel efficiency and driving feeling at the same time. It is thus necessary to regenerate the trapping member at an appropriate timing by measuring the degree of clogging in the trapping member as accurately as practicable.

The degree of clogging of the trapping member is determined by the difference between the pressures before and after the trapping member. Since the internal combustion engine is used under various operating conditions and the difference between the pressures before and after the trapping member depend on a large measure the operating conditions for the same degree of clogging, however, it is impossible to determine the degree of clogging of the trapping member exactly by simply measuring the difference between the pressures before and after the trapping member.

SUMMARY OF THE INVENTION

Accordingly, it is an object of the present invention to provide a method and an apparatus for detecting the degree of clogging of a particle-trapping-member in an internal combustion engine, in which, in view of the fact that the pressure loss of the trapping member and the flow rate of the exhaust gas passing through the trapping member have a predetermined relation in the case where the degree of clogging of the particles-trapping-member is constant, the flow rate of the exhaust gas is directly or indirectly measured and a pressure loss signal for the particle-trapping-member is compared with an exhaust gas flow rate signal, so that the degree of clogging of the particle-trapping-member, namely, the amount of particles captured by the trapping member is accurately detected, thereby solving the problems of the reduced fuel efficiency and the deteriorated driving feeling.

BRIEF DESCRIPTION OF THE DRAWINGS

FIG. 7 is a diagram illustrating the exhaust gas-purifying-apparatus using an engine speed sensor as means for detecting the exhaust gas flow rate according to the present invention.

DESCRIPTION OF THE PREFERRED EMBODIMENTS

Figure 1:
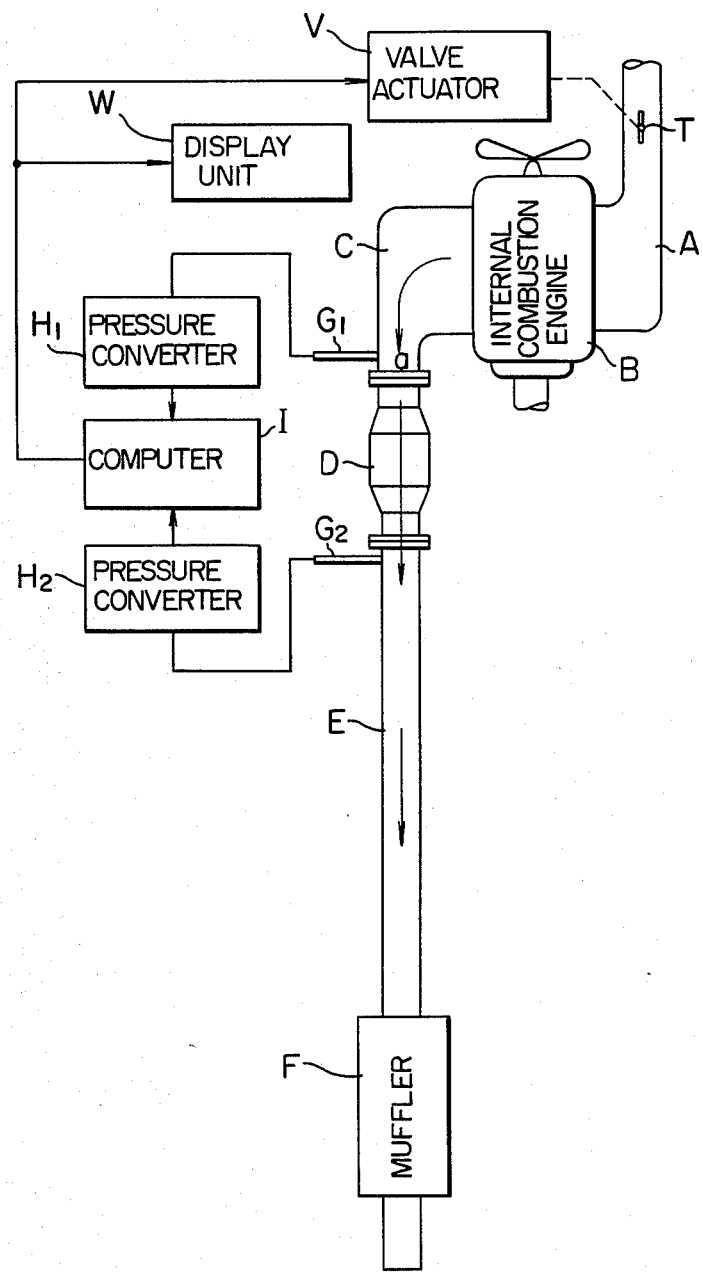
FIG. 1 is a diagram illustrating an embodiment of the exhaust gas-purifying-apparatus for the internal combustion engine to which the method of detecting the clogging degree of the particle-trapping-member according to the present invention is applied.

A preferred embodiment of a method of detecting the degree of clogging of an exhaust gas particle-trapping-member according to the present invention configured on the basis of the concept described later is shown in FIG. 1. Reference character A designates an intake manifold, character T designates an intake throttle valve provided at the inlet of the intake manifold A, character B designates the body of a diesel internal combustion engine (hereinafter referred to as a diesel engine), character C designates an exhaust manifold, character D a particle-trapping-apparatus, character E an exhaust pipe, character F a conventional muffler making up a flow resistor disposed in the exhaust gas flow path, and character V designates a valve actuator for driving the intake throttle valve T.

The particle-trapping-apparatus D, which includes a particle-trapping-member of porous ceramic such as foamed ceramic with a three-dimensional netting structure contained in a housing, is interposed downstream of the exhaust manifold C between the exhaust manifold C and the exhaust pipe E or in the midst of the exhaust pipe E for capturing and purifying the carbon particles contained in the exhaust gas discharged from the internal combustion engine B. Characters G1 and G2 designate exhaust gas pressure lead pipes disposed at the inlet of the particle-trapping-member and between the outlet thereof and the muffler F making up a flow resistor respectively, which exhaust gas pressure lead pipes are connected to pressure converters H1 and H2 of well-known construction through piping respectively. Pressure signals P1 and P2 converted into electrical outputs by the pressure converters H1 and H2 are applied to a computer I respectively, so that a circuit in the computer I described later decides whether or not the degree of clogging of the trapping member has reached such a point as to require regeneration and whether or not the clogging has been removed by the regeneration of the trapping member. The result of this decision is displayed on a display unit W and notified to the driver of the vehicle involved. The display unit includes a lamp, a buzzer or the like. The muffler F comprising the flow resistor, the exhaust gas pressure-leading-pipes G1 and G2 provided upstream and downstream of the particle-capturing-member respectively, the pressure converters H1 and H2 and the computer I make up an apparatus for detecting the clogging degree of the particle-capturing-member according to the present invention.

The operation of the aforementioned embodiment will be described below. During normal operation of the diesel engine B, the intake throttle valve T is full open, so that the exhaust gas containing particles discharged from the internal combustion engine B is applied through the exhaust manifold C as shown by arrow a, filtered by a particle-trapping-member (not shown) of porous ceramic with three-dimensional netting structure contained in a housing while passing through the particle-trapping-member D. The particles in the exhaust gas are removed thereby to purity the exhaust gas, which is discharged into the atmosphere via the exhaust pipe E and the muffler F. In this way, particles are accumulated in the particle-trapping-member, and the particle-trapping-member is slowly clogged, thus increasing the back pressure of the diesel engine B.

Let the difference of pressures before and after the particle-trapping-member be $\Delta P1$, and the difference of pressures before and after the flow resistor provided in the exhaust gas flow path be $\Delta P2$. If the clogging degree of the particle-trapping-member is constant, the value $\Delta P1$ changes substantially in proportion to the value $\Delta P2$ with the operating conditions of the engine. If the value $\Delta P1/\Delta P2$ is taken as K, therefore, K takes a value fixed in accordance with the clogging degree of the particle-trapping-member regardless of the engine operating conditions. With the increase in the clogging degree of the trapping member, the value K increases. Assume that K' is a value taken by K when the clogging of the trapping member has reached a point suitable for regeneration of the trapping member. The calculated value of K is compared with the value K' set in the circuit of the computer I, and when $K \geq K'$, it is time to regenerate the trapping member. By comparing the difference of pressures $\Delta P1$ before and after the trapping member with the difference of pressures $\Delta P2$ before and after the muffler F making up a flow resistor in this manner, it is possible to accurately detect the degree of clogging of the particle-trapping-member, that is, the amount of particles to be captured, thereby permitting the determination of a regeneration timing both accurately and easily. Preferably, the muffler F making up a flow resistor should be provided downstream of the particle-trapping-apparatus D to avoid a resistance change which otherwise might be caused by the particles in the exhaust gas.

On the other hand, the provision of the muffler F making up a flow resistor in the exhaust gas flow path causes an additional increase in the back pressure, thus deteriorating the engine output and the fuel efficiency. Also, the required number of parts is increased to increase the weight of the apparatus. Therefore, the muffler has a comparatively large flow resistance which remains unchanged over a long period, and is thus suitable for use as a flow resistor for the exhaust gas flow rate detector means. Since the outlet of the muffler F is open to the atmosphere, the measurement of the gauge pressure P1 (pressure with the atmospheric pressure as a reference) of the exhaust gas upstream of the particle-trapping-member and the gauge pressure P2 of the exhaust gas between the particle-trapping-member and the muffler F results in $\Delta P1 = P1 - P2$ and $\Delta P2 = P2 - 0 = P2$, indicating that the degree of the clogging of the trapping member is capable of being accurately detected only by measuring the pressures at two points. It is thus possible to provide a low-cost method of detecting the degree of clogging of the particle-trapping-member both accurately and simply. The embodiment of the present invention shown in FIG. 1 is configured on the basis of this concept.

Figure 2:
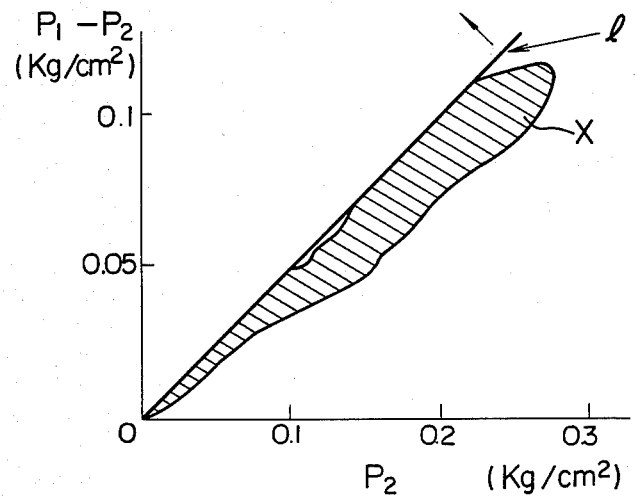
FIG. 2 is a diagram showing the results of an experiment conducted on the embodiment of FIG. 1 with an actual automotive vehicle.

The graph of FIG. 2 shows the result of an experimental application of the embodiment of the present invention shown in FIG. 1 to an actual automotive vehicle having a 2200-cc diesel engine of series four cylinders and a particle-trapping-member of 13-mesh foamed ceramic of 18 l in volume. In the case where the vehicle is not suddenly accelerated or decelerated, the point (P2, P1−P2) changes along the straight line of 1. Even in the case of LA#4 mode of actual vehicle running accompanied by considerably sudden acceleration and deceleration, the particular point changes within the range shown by hatching X in FIG. 2. This substantiates the concept of the present invention that the pressure differnece $\Delta P1$ before and after the particle-trapping-member is proportional to pressure difference $\Delta P2$ before and after the flow resistor F provided in the exhaust gas flow path. It has also been confirmed that according as the degree of clogging of the trapping member increases by the particles captured in the trapping member, the straight line 1 is increasingly inclined as shown by arrow in FIG. 2. It has thus been found that the clogging degree detecting apparatus for the particle-trapping-member according to the present invention is capable of detecting the clogging degree of a trapping member considerably accurately.

Figure 3:
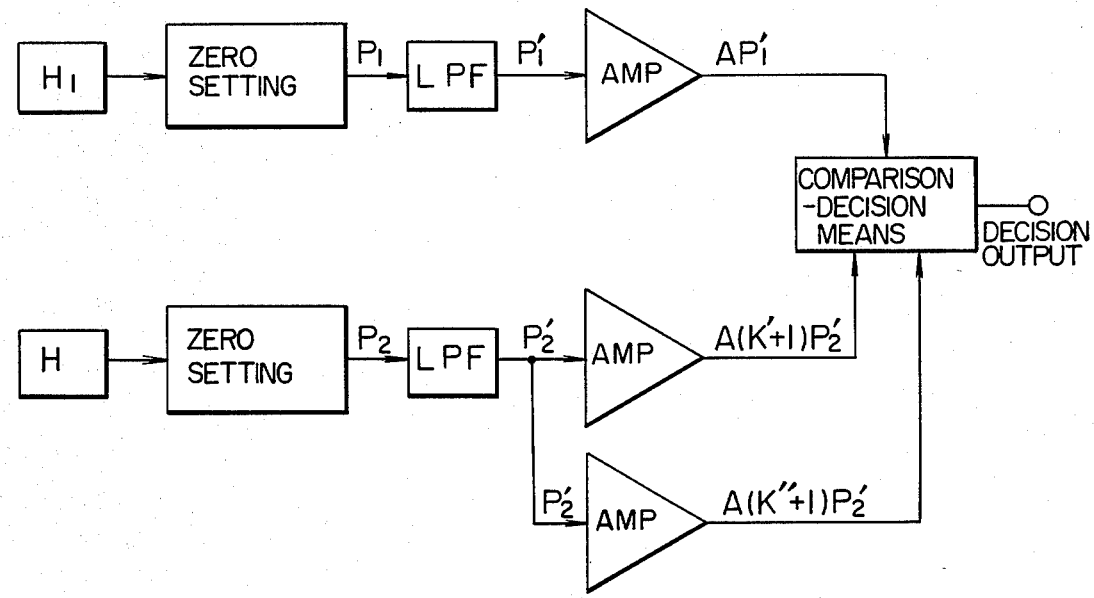
FIG. 3 is a block diagram showing an internal circuit configuration of a computer I used in the embodiment according to the present invention shown in FIG. 1.

A block diagram of the internal circuit of the computer I according to the embodiment of the invention of FIG. 1 is shown in FIG. 3. As explained above, regeneration of the trapping member is required when $$\frac{\Delta P1}{\Delta P2} = \frac{P1 - P2}{P2} \geq K'$$

namely, when $P1 - (K' + 1)P2 \geq 0$. As shown in FIG. 3, the pressure converter H1 and the pressure converter H2 on the inlet and outlet sides of the trapping member respectively are set to zero during engine shutdown thereby enabling the detection of the inlet gauge pressure P1 and the outlet gauge pressure P2. Also, in order to prevent an erroneous operation owing to the ripple of the pressure signal, the signals P1 and P2 are passed through a low-pass filter (LPF) to remove the ripple, thus converting the pressures into P1' and P2'. The pressure signals P1' and P2' thus converted are amplified up to a required voltage by amplifiers of gain A and gain $A(K'+1)$ (A: a given constant other than zero) respectively, and compared with each other at a comparison-decision circuit. When $AP1' - A(K'+1) P2' \geq 0$, namely, $$\Delta P1/\Delta P2 = \frac{P1 - P2}{P2} = \frac{P1' - P2'}{P2'} \geq K',$$

a regeneration command signal is produced. In response to this regeneration command signal, the intake throttle valve T is closed by a required amount automatically or manually, with the result that the amount of intake air is reduced and the temperature of the exhaust gas discharged from the diesel engine B is increased. The particle-trapping-member (not shown) contained in the particle-trapping-apparatus D is heated by the exhaust gas, so that the trapped carbon particles are burnt for regeneration of the trapping member. According to the present invention, it is also possible to determine whether or not the clogging degree of the trapping member has reached a point where the regeneration is considered to have been completed. The embodiment of FIG. 1 is configured to be capable of this decision on the regeneration and is such that when the clogging of the trapping member is eliminated with the pressure difference $\Delta P1$ before and after the trapping member reduced to a point where $$\Delta P1/\Delta P2 = \frac{P1 - P2}{P2} \leq K''$$

($K''$: a value taken by $\Delta P1/\Delta P2$ when the clogging degree of the trapping member has reached a point where regeneration is considered to have been completed), the signals are compared in the same manner as in the circuit of FIG. 3 to decide whether or not the regeneration of the trapping member has been completed. Specifically, when $AP1' - A(K''+1) P2' \leq 0$, namely, when $$\Delta P1/\Delta P2 = \frac{P1 - P2}{P2} = \frac{P1' - P2'}{P2'} \leq K''.$$

a signal representative of the completion of regeneration is produced. In response to this regeneration completion signal, the intake throttle valve T is opened full as in original state automatically or manually thereby to complete the regeneration. In conventional methods of detecting the completion of regeneration of the particle-trapping-member, regeneration is considered to have been completed when the time of the regenerating operation has reached a predetermined length. In the case of regeneration by intake control of the diesel engine, however, the exhaust gas temperature largely depends on the engine speed and torque, and therefore, if the regenerating operation is set to a long time, unnecessary regeneration may be continued resulting in a deteriorated fuel efficiency and driving feeling. If the regenerating operation is set to a short period of time, by contrast, an insufficient regeneration causes an increased back pressure, so that the engine output is reduced, thus deteriorating the fuel efficiency and driving feeling at the same time. As described above, the clogging degree detecting apparatus for the particle-trapping-member according to the present invention provides a superior means of deciding on the completion of regeneration of the particle-trapping-member.

Figure 4:
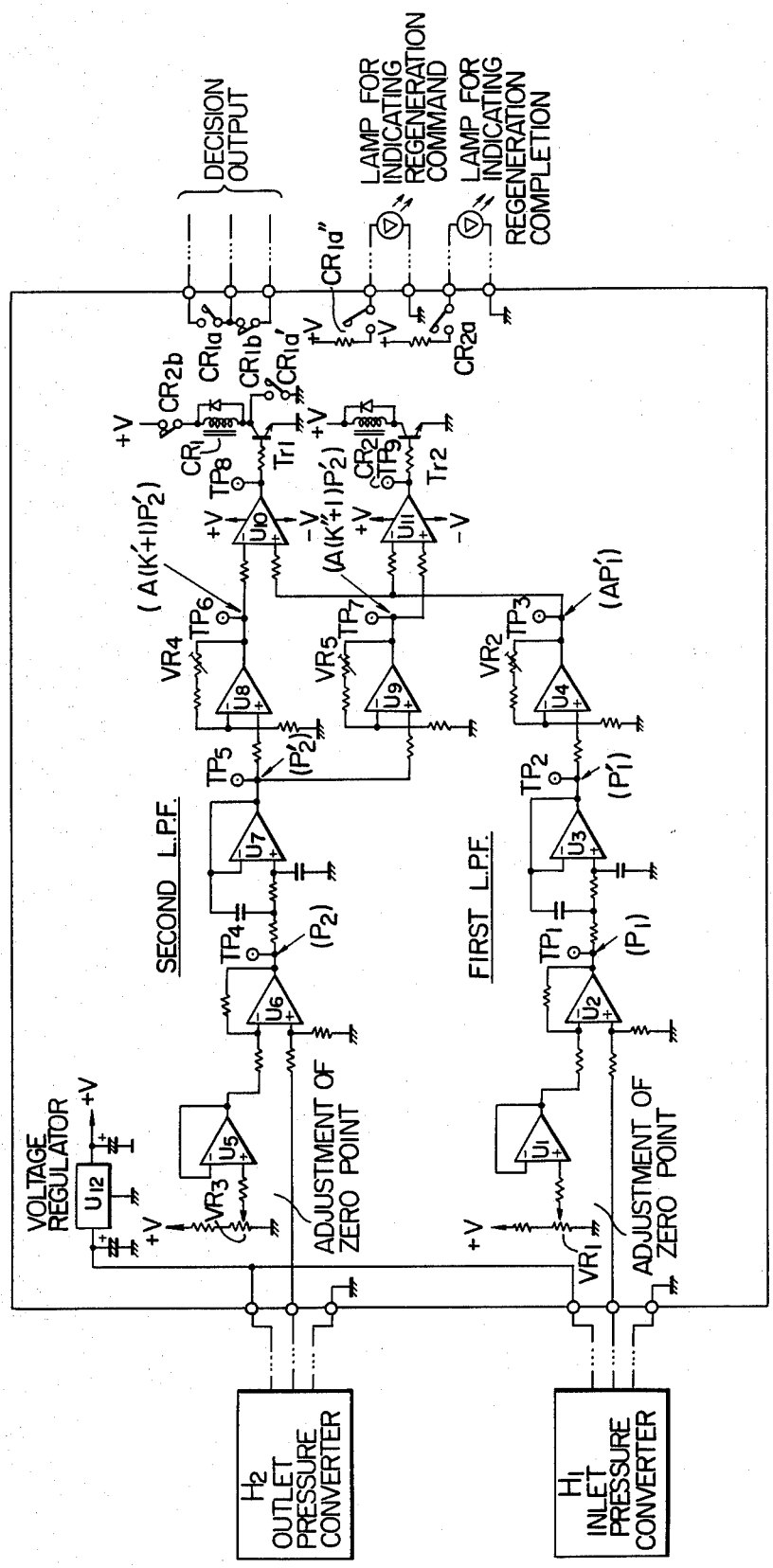
FIG. 4 shows the internal circuit of the computer I based on the block diagram of FIG. 3.

FIG. 4 shows an actual circuit based on the block diagram of the computer I of FIG. 3. In FIG. 4, the pressure converter H1 and the pressure converter H2 on the inlet and outlet sides of the particle-trapping-member respectively are subjected to zero-point setting in the stationary of state of the internal combustion engine by a first potentiometer VR1 controlled by operational amplifiers $U_1$ and $U_2$ and by a second potentiometer VR3 controlled by fifth and sixth operational amplifiers $U_5$ and $U_6$, thereby detecting the inlet gauge pressure P1 at point TP1 and the outlet gauge pressure P2 at point TP4. Further, in order to prevent the erroneous operation by the ripple of the pressure signals P1 and P2, the signals P1 and P2 are applied through a first low-pass filter (first LPF) including a third operational amplifier $U_3$ and a second low-pass filter (second LPF) including a seventh operational amplifier $U_7$ respectively, thus converting the signals P1 and P2 into other pressure signals P1' and P2' respectively. The signals P1' and P2' are than amplified by non-reversing amplifier circuits of the fourth and eighth operational amplifiers $U_4$ and $U_8$ respectively at the gains of A and $A(K'+1)$ (A: a given constant other than zero) thereby to change the point TP3 to AP1' and point TP6 to $A(K'+1)P2'$ respectively. The signals AP1' and $A(K'+1)P2'$ are compared with each other by a comparator circuit (the 10th operational amplifier $U_{10}$). If $AP1' \geq A(K'+1)P2'$, that is, $$\Delta P1/\Delta P2 = \frac{P1 - P2}{P2} = \frac{P1' - P2'}{P2'} \geq K'.$$

the voltage at point TP8 takes a value near the source voltage $+V$ of the tenth operational amplifier $U_{10}$, and the first transistor Tr1 is turned on, with the result that the first relay CR1 is pperated and the contact CR1a representing an output signal of the regeneration command is closed while the contact CR1b is opened. Once the first relay CR1 is actuated, the contact CR1a' remains closed until the operation of the second relay CR2 upon completion of the regeneration as mentioned later. The contact signal of a regeneration command thus continues to be produced by a self-holding circuit. The circuit for deciding whether or not the degree of clogging of the particle-trapping-member reached a point where regeneration is considered to have been completed will be described now. The signal representing the output gauge pressure P2' is amplified by the non-reversal amplifier circuit of the ninth operational amplifier $U_9$ at the gain of $A(K''+1)$ ($K''$: a value taken by $\Delta P1/\Delta P2$ when the clogging degree of the trapping member is considered to have reached a point where regeneration has been completed), and the signal at point TP7 is changed to $A(K''+1)P2'$. This signal $A(K''+1)P2'$ and the signal AP1' at point TP3 are compared with each other at a comparator circuit comprising the 11th operational amplifier $U_{11}$. When $AP1' \leq A(K''+1)P2'$, that is, $$\Delta P1/\Delta P2 = \frac{P1 - P2}{P2} = \frac{P1' - P2'}{P2'} \leqq K'',$$

the voltage at point TP9 takes a value near the source voltage +V of the 11th operational amplifier $U_{11}$, so that the second transistor Tr2 is turned on, with the result that the second relay CR2 is actuated. The contact CR2b is opened, and the operation of the first relay CR1 is restored. The contact CR1a representing a decision output signal is opened, while the contact CR1b is closed. This signal provides a decision output upon completion of regeneration. This regeneration command and the contact signal for completion of regeneration make up control signals for closing the intake throttle valve by a required amount or opening the same valve to original full state. In FIG. 4, character $U_{12}$ designates a voltage regulator for supplying a constant voltage to the inlet pressure converter H1 and the outlet pressure converter H2.

Figure 5:
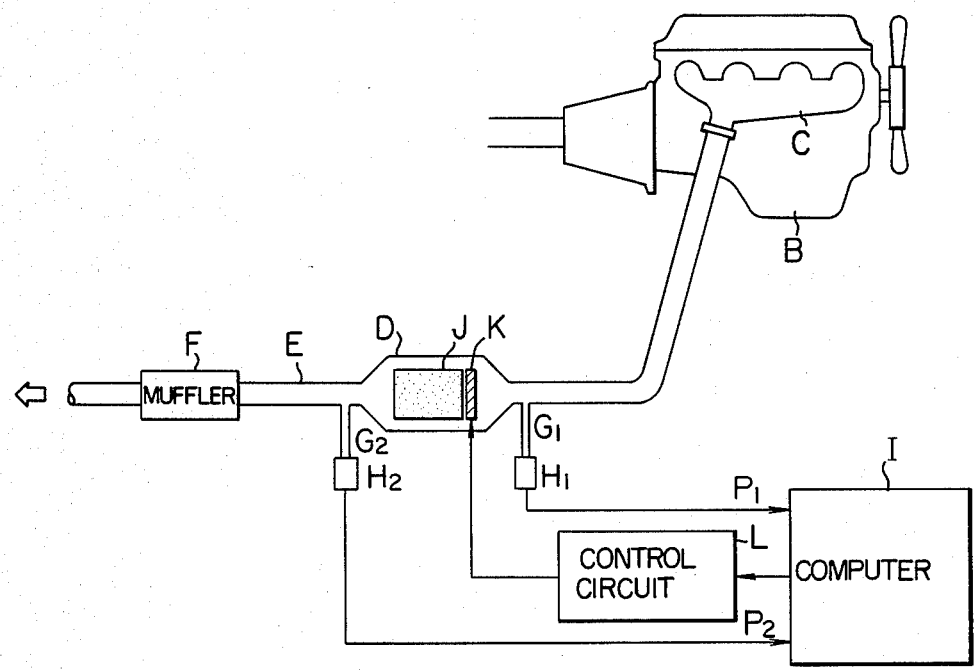
FIG. 5 is a diagram illustrating the exhaust gas-purifying-apparatus using an electric heater for regeneration of the particle-trapping-member according to the present invention.

In the embodiment under consideration, a method of regeneration by heating with the intake throttle valve T is shown. Apart form this method, a method of regeneration by directly heating the particle-trapping-member with an electric heater is illustrated in FIG. 5. In FIG. 5, the system for issuing a regeneration command and deciding on the completion of regeneration of the trapping member J uses the pressure converters H1 and H2 for the inlet and outlet sides respectively and the computer I, so that when a decision signal on the regeneration command is produced from the computer I, current is supplied to an electric heater via a control circuit, with the result that the burning of the trapped particles by the red heating of the electric heater K shifts from upstream to downstream of the trapping member thereby to complete the regeneration. Upon completion of the regeneration of the trapping member J, the decision signal on the completion of regeneration is produced from the computer I thereby to stop the power supply to the electric heater K through the control circuit L. By this method, the trapping member J is regenerated by the electric heater K.

Figure 6:
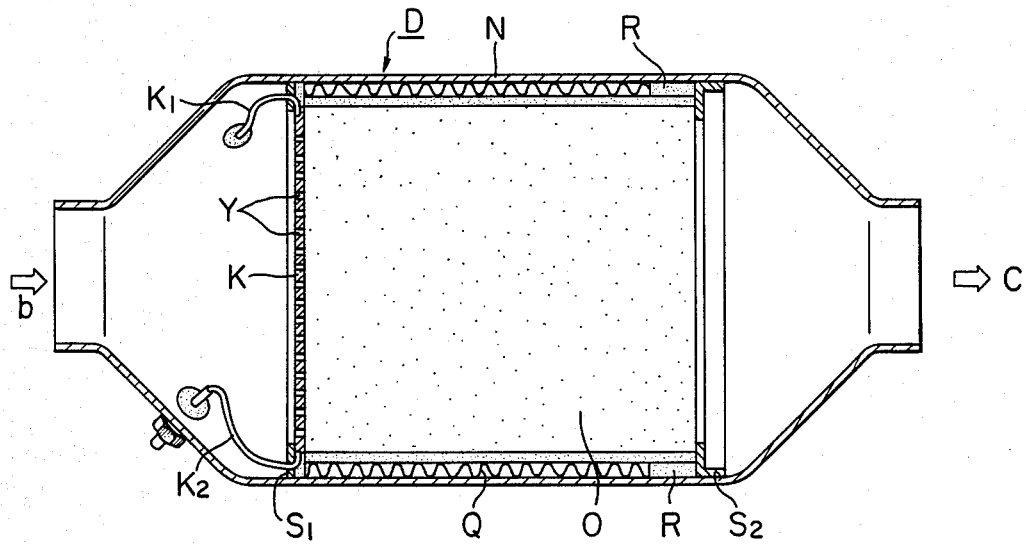
FIG. 6 is a schematic diagram showing a particle-trapping-apparatus used in the present invention.

A particle-trapping-apparatus according to the present invention will be described. The particle-trapping-apparatus D is schematically shown in FIG. 6. In FIG. 6, the casing N includes a trapping member O of ceramic in the form of cylinder or oval cylinder having a plurality of through holes Y. A buffer member Q and a shield member R are interposed between the outer periphery of the trapping member O and the inner periphery of the casing N. The upstream end face of the trapping member O is closely contacted by the electric heater K by lead wires $K_1$ and $K_2$. The trapping member O and the electric heater K are fixed in axial direction by ring stays S1 and S2 provided on the casing N.

In FIG. 6, the exhaust gas containing the particles discharged from the internal combustion engine B is filtered by being applied in the direction of b through the particle-trapping-apparatus D of ceramic. The particles in the exhaust gas are thus removed, with the result that the purified exhaust gas is discharged in the direction c.

The method of regeneration according to the embodiment under consideration uses heating by the intake throttle valve T. The present invention is not limited to this method, but may employ a method of heating the trapping member directly with electric wires or the like or a combination of the methods. Also, the embodiment under consideration uses a signal representative of the difference of pressures before and after the flow resistor F provided in the exhaust gas flow path as means for detecting the exhaust gas flow rate. The present invention is not limited to such means but in view of the fact that the intake air is not subjected to throttle control in normal operation and therefore the flow rate of the exhaust gas is substantially proportional to the engine speed in the case of the diesel engine, a tachometer may be provided and by comparing the pressure difference $\Delta P1$ before and after the particle-trapping-member with the output signal of the tachometer at a computer, the degree of clogging of the trapping member may be detected. In an exhaust gas particle-purifying-system for an internal combustion engine provided with a particle-trapping-member, the flow resistance of the particle-trapping-apparatus D alone changes, and therefore in all the embodiments of the present invention, only the pressure P1 on inlet side of the particle-trapping-member may be measured instead of the pressure difference $\Delta P1$ ($=P1-P2$) before and after the particle-trapping-member, so that the value P1 is compared with the flow rate of the exhaust gas thereby to detect the degree of clogging of the trapping member. In this case, the disadvantage is that since the pressure corresponding to the flow resistance downstream of the particle-trapping-apparatus D is added, the rate of change of the pressure signal is reduced resulting in a slightly deteriorated S/N ratio of the signals. In the case where an engine speed sensor Z is used as a means for detecting the exhaust gas flow rate as shown in, however, only one pressure converter is sufficient, thus leading to the advantage of a simple and low-cost clogging degree detecting system for the particle-trapping-member.

It will be understood from the foregoing description that according to the method of the present invention, the difference of the pressures $\Delta P1$ before and after the particle-trapping-member or the inlet pressure P1 of the trapping member is compared with an exhaust gas flow rate signal thereby to detect the clogging degree of the particle-trapping-member. As compared with the conventional method in which the timing of regeneration is determined from the accumulated engine speeds or accumulated distance coverage, the degree of clogging can be detected very accurately regardless of the engine operating conditions. The regeneration timing and the completion of regeneration are thus accurately determined, thereby improving the fuel efficiency, output performance and the driving feeling of the internal combustion engine. Further, in the case where a flow resistor is disposed in the exhaust gas flow path and the differential pressure $\Delta P2$ between before and after the flow resistor is used as the above-mentioned exhaust gas flow rate signal, it is possible to accurately detect the clogging degree of the trapping member from the value of $\Delta P1/\Delta P2$, thereby simplifying the circuits used with the computer.

We claim:

1. A method for detecting the degree of clogging of a particle-trapping-member of an internal combustion engine and for trapping the particles contained in the exhaust gas discharge from an internal combustion engine by the particle-trapped-member disposed in the exhaust gas flow path, comprising:

the step of measuring a selected one of the difference $\Delta P1$ of the pressure before and after said particle-trapped-member and the pressure P1 on the inlet side of said particle-trapping-member;

the step of measuring an exhaust gas flow rate signal produced from exhaust gas flow rate detector means, the step of comparing the selected one of the difference ΔP1 and the pressure P1 with the exhaust gas flow rate signal, thereby detecting the degree of clogging of said particle-trapping-member, wherein a muffler is disposed in the exhaust gas flow path at the downstream side of said particle-trapping-member as said exhaust gas flow rate detector means, and the outlet of said muffler is open to the atmosphere, and the pressure on the inlet side of said muffler is used as said exhaust gas flow rate signal.

2. A method according to claim 1, wherein the degree of clogging of said particle-trapping-member is detected from the value of a selected one of ΔP1/P2 and P1/P2, where ΔP1 is the difference of pressures before and after said particle-trapping-member, P1 is the pressure on the inlet side of said particle-trapping-member, and P2 is the pressure on the inlet side of said muffler.

3. In an exhaust gas purifying-system for an internal combustion engine provided with a particle-trapping-member disposed in an exhaust gas flow path, an apparatus for detecting the degree of clogging of the particle-trapping-member of said internal combustion engine, comprising a muffler whose outlet is open to the atmosphere and making up a flow resistor disposed in said exhaust gas flow path at the downstream side of said particle-trapping-member, exhaust gas pressure lead pipes disposed at the inlet and outlet sides of said particle-trapping-member respectively, pressure converters connected to said exhaust gas pressure lead pipes respectively for converting pressure into electrical signals, and a computer supplied with the electrical signals from said pressure converters for comparing a selected one of the difference ΔP1 of pressures before and after said particle-trapping-member and the pressure P1 at the inlet side of said particle-trapping-member with an exhaust gas flow rate signal, thereby detecting the degree of clogging of said particle-trapping-member caused by capturing particles.

4. An apparatus according to claim 3, further comprising a display unit for informing the vehicle driver of the degree of clogging of said particle-trapping-member in response to an output from said computer, an intake manifold for supplying intake air to said internal combustion engine, and an intake throttle valve disposed in said intake manifold for controlling the rise in temperature of the exhaust gas by reducing the volume of the intake air by the rotation.

5. In an exhaust gas purifying-system for an internal combustion engine provided with a particle-trapping-member disposed in an exhaust gas flow path, an apparatus for detecting the degree of clogging of the particle-trapping-member of said internal combustion engine, comprising a muffler making up a flow resistor disposed in said exhaust gas flow path, exhaust gas pressure lead pipes disposed at the inlet and outlet sides of said particle-trapping-member respectively, pressure converters connected to said exhaust gas pressure lead pipes respectively for converting pressure into electrical signals, and a computer supplied with the electrical signals from said pressure converters for comparing a selected one of the difference ΔP1 of pressures before and after said particle-trapping-member and the pressure P1 at the inlet side of said particle-trapping-member with an exhaust gas flow rate signal, thereby detecting the degree of clogging of said particle-trapping-member caused by capturing particles, wherein said computer includes means for zero-setting said pressure converters when said internal combustion engine is stopped, low-pass filters for removing the ripples of output signals from said zero-setting means, amplifiers for amplifying the pressure signals free of the ripples to a required voltage level, and a comparison-decision circuit for comparing the output signals from said amplifiers with each other and producing a regeneration command signal for said particle-trapping-member.

6. A method for detecting the degree of clogging of a particle-trapping-member of an internal combustion engine and for trapping the particles contained in the exhaust gas discharged from internal combustion engine by the particle-trapping-member disposed in the exhaust gas flow path, comprising:

the step of measuring a selected one of the difference ΔP1 of the pressure before and after said particle-trapping-member and the pressure P1 on the inlet side of said particle-trapping-members;

the step of measuring an exhaust gas flow rate signal produced from exhaust gas flow rate detector means, the step of comparing a selected one of the difference ΔP1 and the pressure P1 with the exhaust gas flow rate signal, thereby detecting the degree of clogging of said particle-trapping-member, wherein an engine speed sensor of said internal combustion engine is used as means for detecting the exhaust gas flow rate, and an output signal of said engine speed sensors used as said exhaust gas flow rate signal.

7. An apparatus according to claim 3, further comprising a display unit for informing the vehicle driver of the degree of clogging of said particle-trapping-member in response to an output from said computer, and an electric heater provided in close proximity to the upstream side of said particle-trapping-member.

* * * * *